United States Patent [19]
Sanford

[11] Patent Number: 5,334,822
[45] Date of Patent: Aug. 2, 1994

[54] METHOD AND SYSTEM FOR INVENTORING A DISTRIBUTED PLURALITY OF ITEMS ON A SUPPLY

[75] Inventor: Michael D. Sanford, Arlington, Tex.

[73] Assignee: Universal Computer Technologies Inc., Fort Worth, Tex.

[21] Appl. No.: 527,073

[22] Filed: May 21, 1990

[51] Int. Cl.$^5$ .............................................. G06F 15/24
[52] U.S. Cl. ................................... 235/385; 235/375; 364/403
[58] Field of Search ................. 235/385, 375; 364/403

[56] References Cited

U.S. PATENT DOCUMENTS

| | | | |
|---|---|---|---|
| 4,141,078 | 2/1979 | Bridges, Jr. et al. | 235/385 |
| 4,340,810 | 7/1982 | Glass | 235/385 |
| 4,455,483 | 6/1984 | Schönhuber | 235/375 |
| 4,514,815 | 4/1985 | Anderson | 235/385 |
| 4,639,875 | 1/1987 | Abraham et al. | 235/385 |
| 4,835,372 | 5/1989 | Gombrich et al. | 235/375 |
| 4,983,818 | 1/1991 | Knowles | 235/472 |
| 5,025,140 | 6/1991 | Varley | 235/385 |
| 5,038,283 | 8/1991 | Caveney | 235/385 |
| 5,059,778 | 10/1991 | Zouzoulas et al. | 235/572 |

OTHER PUBLICATIONS

"Computerized Library Systems: Where they've been and where they're going", by J. Bryn Lewis, Bar Code News, Jul./Aug. 1984, pp. 24-28.

"Libraries Make Book on Bar Codes", by Peter C. Doyle, ID Systems, Nov. 1989, pp. 31-35.

"Bar Code Goes to College", by Bob Kearney, ID Systems, Dec. 1989, pp. 12-14.

"Los Alamos: Where Critical Research Relies on Bar Code", by Elise M. Fleischaker, ID Systems, Oct. 1990, pp. 19-28.

"Bar Codes Tally Tile", by Michael F. Cummings, ID Systems, Nov. 1990, pp. 50-56.

*Primary Examiner*—Eugene R. LaRoche
*Assistant Examiner*—Christophor R. Glembocki
*Attorney, Agent, or Firm*—Melvin A. Hunn

[57] ABSTRACT

A system is provided for inventorying a plurality of items in a supply. The items include a plurality of sub-groupings of similar "item types" which are distributed in a selected pattern among a plurality of known locations. The inventory process is done by a plurality of known inventory entities. The system includes a plurality of type identifiers, each carrying machine readable data specific to an item type, for distinguishing a particular item type from other item types. A plurality of sequential item identifiers are also provided for carrying machine readable data. A unique item identifier is applied to each item in the supply without regard to item type, for distinguishing each item from other items within and without a particular item type subgrouping. A device is provided for reading and storing machine readable data from the type identifiers and item identifiers. A computer is provided with a database computer program resident in memory for receiving machine readable data in a data stream from the device for reading and storing. The computer database program includes a plurality of fields of data pertaining to each item type and a plurality of fields of data pertaining to each item. The database computer program automatically identifies all item identifiers in a data stream to an adjoining type identifier in the data stream.

9 Claims, 17 Drawing Sheets

```
FORMAT REPORT - Detail
                                                    Page:    1
                                                    Date:  05/14/90

Name: TIFTEAM1, FORMAT FOR INVENTORY TEAM FILE

Record Information:                  Lst Chg Date: 01/29/90
           Key Size-3    #FldSep-0            Lst Chg Time: 19:34:44
           Rec Size-43   #KeyInd-1            Created Date: 01/29/90

F     KENPDY      ------Position------
Data Element   Length   S HELP YTTDTN      Record    Internal
==========================================================

1 TEAM-CODE ...... 3      -        Y--1--       1-3        1-3
2 TEAM-NAME ...... 20     -        -----        4-20       4-20
3 TEAM-LEADER .... 20     -        --1--        24-20      24-20
```

FIG 4

FORMAT REPORT - Detail

Page: 1
Date: 05/14/90

Name: TIFCATL2, FORMAT OF BOOK TITLE CATALOG (ISBN CODE)

Record Information:
Key Size-10    #FldSep-0
Rec Size-332   #KeyInd-1

Lst Chg Date: 03/22/90
Lst Chg Time: 16:15:42
Created Date: 11/04/89

| Data Element | Length | F S | HELP | KENPDY YTTDTN | Position Record | Internal |
|---|---|---|---|---|---|---|
| 1 ISBN | 10 | - |  | Y--3-- | 1-10 | 1-10 |
| 2 ATALOG-CODE | 9 | - |  | --3-- | 11-9 | 11-9 |
| 3 BOOKTITLE | 60 | - |  | ---- | 20-60 | 20-60 |
| 4 MA2CODE | 9 | - |  | ---- | 80-9 | 80-9 |
| 5 MA3CODE | 9 | - |  | ---- | 89-9 | 89-9 |
| 6 CONS | 1 | - |  | ---- | 98-1 | 98-1 |
| 7 AID | 3 | - |  | ---- | 99-3 | 99-3 |
| 8 NOTE | 2 | - |  | ---- | 102-2 | 102-2 |
| 9 PRICE | 6.2 | - |  | --11-- | 104-6 | 104-6 |
| 10 PUBLISHER | 12 | - |  | ---- | 110-12 | 110-12 |
| 11 DEP | 1 | - |  | ---- | 122-1 | 122-1 |
| 12 COPYRIGHT | 1*8 | - |  | ---- | 123-2 | 123-2 |
| 13 BOOL-FIELD | 2 | - |  | ---Y | 125-8 | 125-8 |
| 14 ADOPT-BEGIN | 2 | - |  | ---- | 133-2 | 133-2 |
| 15 ADOPT-END | 6 | - |  | ---- | 135-2 | 135-2 |
| 16 LAST-UPDATED | 1 | - |  | -1-1- | 137-6 | 137-6 |
| 17 STATUS | 3 | - |  | ---- | 143-1 | 143-1 |
| 18 QUOTA | 2 | - |  | ---- | 144-3 | 144-3 |
| 19 TICKET | 1*8 | - |  | ---- | 147-2 | 147-2 |
| 20 BOOL-RP-FIELD | 1*9 | - |  | ---Y | 149-8 | 149-8 |
| 21 INV-CNTS | 6 | - |  | ---- | 157-8 | 157-8 |
| 22 TYRKIDCNT | 6 | - |  | ---- | 238-6 | 238-6 |
| 23 LYRKIDCNT | 5 | - |  | ---- | 244-6 | 244-6 |
| 24 TYRTEACH | 7 | - |  | ---- | 250-5 | 250-5 |
| 25 STATECNT | 6 | - |  | ---- | 255-7 | 255-7 |
| 26 REORDER-CNT | 9 | - |  | ---- | 262-6 | 262-6 |
| 27 CRED-PEND | 9 | - |  | ---- | 268-9 | 268-9 |
| 28 CRED-RETN | 9 | - |  | ---- | 277-9 | 277-9 |
| 29 CRED-ADOPT | 9 | - |  | ---- | 286-9 | 286-9 |
| 30 CRED-REBI | 8 | - |  | ---- | 295-9 | 295-9 |
| 31 RFE-2 | 6 | - |  | ---- | 304-8 | 304-8 |
| 32 REF-3 | 6 | - |  | ---- | 312-6 | 312-6 |
| 33 RFE-4 | 9 | - |  | ---- | 318-6 | 318-6 |
| 34 FILLER | - | - |  | ---- | 324-9 | 324-9 |

FIG 6

FORMAT REPORT - Detail

Page:   1
                                                                           Date:  05/14/90

Name: TIFSERL1, FORMAT FOR BOOK SERIAL NUM MASTER FILE

Record Information:                      Lst Chg Date: 01/26/90
       Key Size-9    #FldSep-0        Lst Chg Time: 11:47:38
       Rec Size-115  #KeyInd-1                   Created
Date: 04/10/89

|  |  | F |  | KENPDY | ——Position—— | |
|---|---|---|---|---|---|---|
| Data Element | Length | S | HELP | YTTDTN | Record | Internal |
|===|===|===|===|===|===|===|
| 1 SERIAL-NUM | 3 | - |  | Y2-3-- | 1-9 | 1-9 |
| 2 ISBN | 10 | - |  | --3-- | 10-10 | 10-10 |
| 3 CAMPUS-CODE | 3*6 | - |  |  | 20-18 | 20-18 |
| 4 TEAM-CODE | 3*6 | - |  | --1-- | 38-18 | 38-18 |
| 5 IN-ATE | 6 | - |  | -1-2- | 56-6 | 56-6 |
| 6 STUDENT-ID | 9*6 | - |  |  | 62-54 | 62-54 |

FIG 8

METHOD AND SYSTEM FOR INVENTORING A DISTRIBUTED PLURALITY OF ITEMS ON A SUPPLY

BACKGROUND OF THE INVENTION

1. Field of the Invention

This invention relates generally to inventory systems, and particularly to an inventory system for inventorying a plurality of items in a supply, including a plurality of subgroupings of similar item types.

2. Description of the Prior Art

Inventory systems are becoming increasingly important in our modern society, particularly in view of the recent development of just-in--time supply techniques. It is well known that nearly all industries are working toward a just-in-time approach to making raw materials and finished products available for use or consumption.

All inventory systems are driven by an overriding concern for accuracy, which is necessary for intelligently managing any supply of items. Very little work has been done toward modernizing inventory techniques in school districts for managing the supply, location, and availability of text books for the students. Frequently it takes weeks or months to receive an order of text books from a publisher, once an order is placed. Therefore, school districts have traditionally overreacted to the risk of having a shortfall in text books by over-ordering of texts.

Since most text book control systems are rather rudimentary, it is also not uncommon for a school district to have many thousands of misplaced, unused, and superfluous text books. School administrators and principals are also known to shift large blocks of student texts from school to school without regard to the existing inventory control systems, further increasing the inaccuracy of the system and loss of data. Of course, it is extremely expensive for school districts to maintain a huge volume of books which are unnecessary and which become useless as subsequent editions of each book are issued. In other words, valuable public resources are squandered by current text book inventory and control systems.

SUMMARY OF THE INVENTION

It is one objective of the present invention to provide a system for inventorying a plurality of items in a supply, and creating a computer database for storing data relating to each inventory item as well as each inventory item type.

It is another objective of the present invention to provide a system for inventorying a plurality of items in a supply, in which each item in the supply is tagged with a unique identifier, which distinguishes that item from every other item in the supply independently of item type subgroupings.

It is another objective of the present invention to provide a system for inventorying a plurality of items in a supply, in which the items in the supply are tagged with a machine readable symbology, and in which separate machine readable identifiers are provided for identifying item types within the item supply, wherein database assembly is facilitated by automatic linking of item type data to particular items in a supply by analyzing the data stream created during the inventory process.

It is still another objective of the present invention to provide a system for inventorying a plurality of items in a supply, in which a plurality of data fields relating to item type, inventory entities, and each particular item (including chain of custody, and location) are assembled in a relational database.

These and other objectives are achieved as is now described. A system is provided for inventorying a plurality of items in a supply. The items include a plurality of subgroupings of similar "item types" which are distributed in a selected pattern among a plurality of known locations. The inventory process is done by a plurality of known inventory entities. The system includes a plurality of type identifiers, each carrying machine readable data specific to an item type, for distinguishing a particular item type from other item types. A plurality of sequential item identifiers are also provided for carrying machine readable data. A unique item identifier is applied to each item in the supply without regard to item type, for distinguishing each item from other items within and without a particular item type subgrouping. A means is provided for reading and storing machine readable data from the type identifiers and item identifiers. A computer is provided with a database computer program resident in memory for receiving machine readable data in a data stream from the means for reading and storing. The computer database program includes a plurality of fields of data pertaining to each item type and a plurality of fields of data pertaining to each item. The database computer program automatically identifies all item identifiers in a data stream to an adjoining type identifier in the data stream.

The system of the present invention may further include a plurality of inventory entity identifiers, each carrying machine readable data specific to an inventory entity for distinguishing that particular inventory entity from other inventory entities. The machine readable data from the inventory entity identifiers are read and stored by the means for reading and storing. The machine readable data are transferred in a data stream to the computer along with machine readable data from the type identifiers and the item identifiers. The database computer program automatically identifies all item identifiers and type identifiers in the data stream to an adjoining inventory entity identifier in the data stream.

The above as well as additional objects, features, and advantages of the invention will become apparent in the following detailed description.

BRIEF DESCRIPTION OF TEE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 depicts in tabular form the data fields available within the computer program which pertain to and identify particular inventory teams;

FIG. 6 depicts in tabular form the data fields available within the computer program of the present invention, which pertain to and identify particular item types;

FIG. 8 depicts in tabular form the fields of data available within the computer program of the present invention, which relate to the individual identifier code;

Figure 9A:
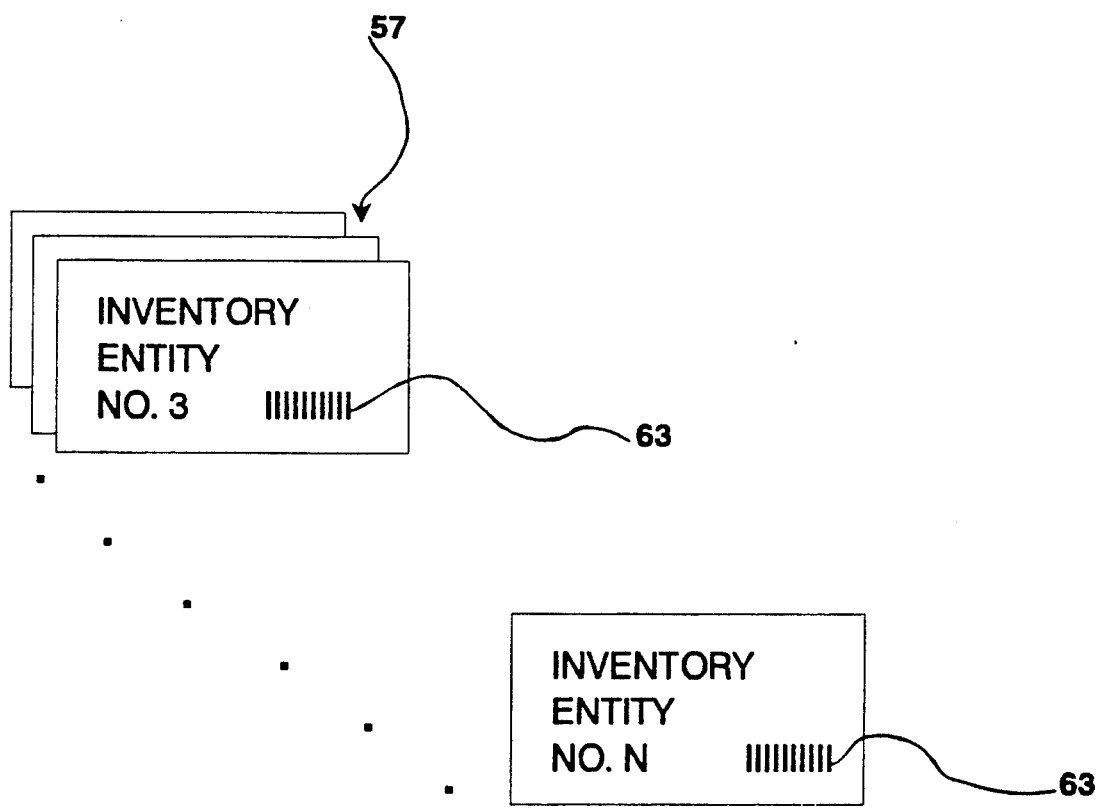
Figure 9B:
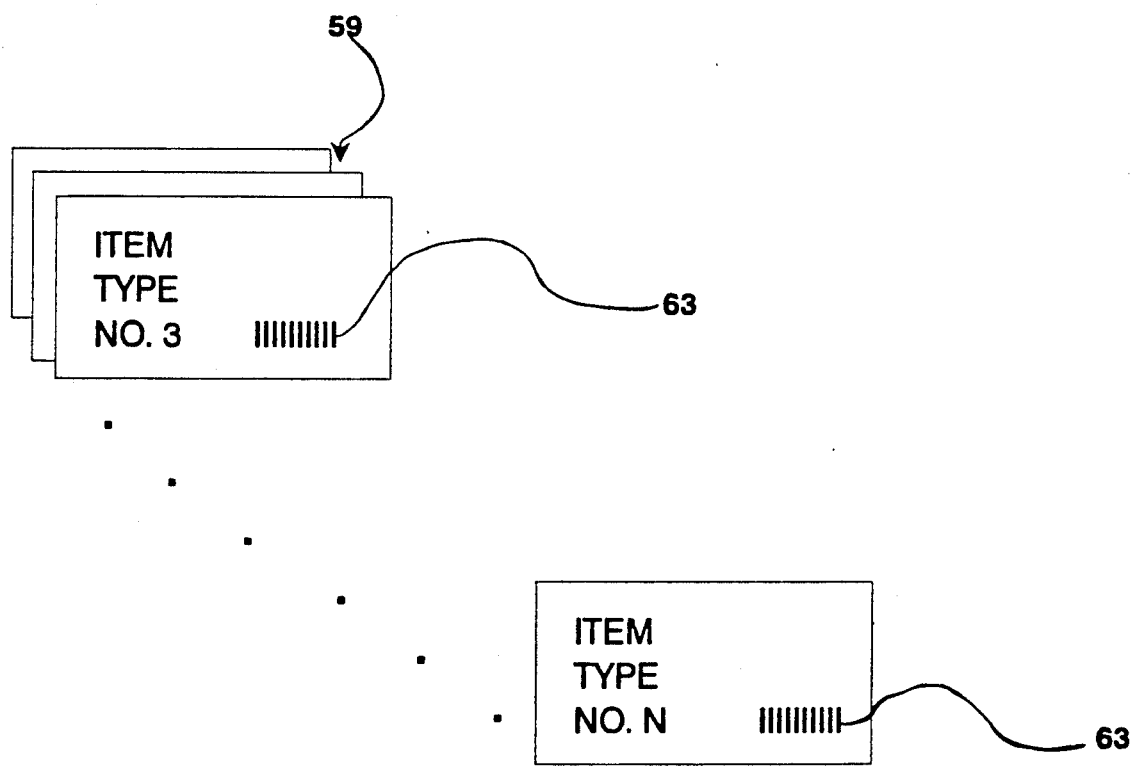
Figure 9C:
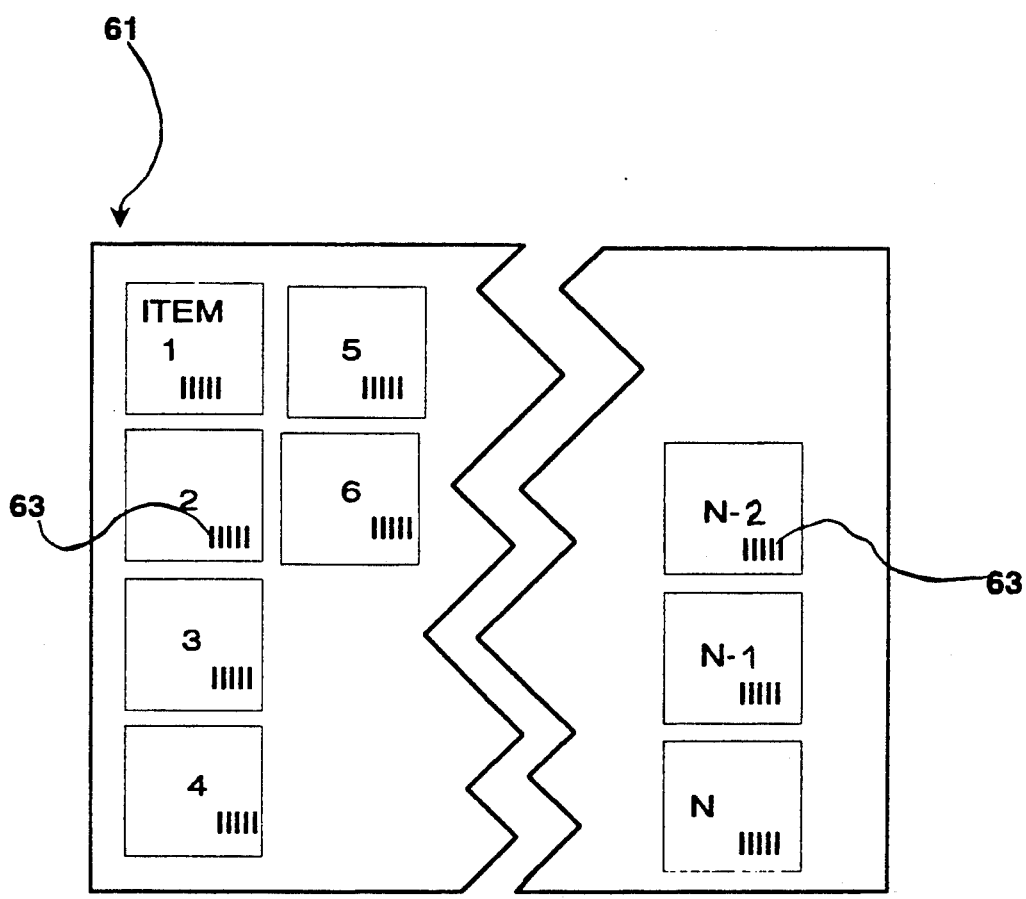
Figure 10:
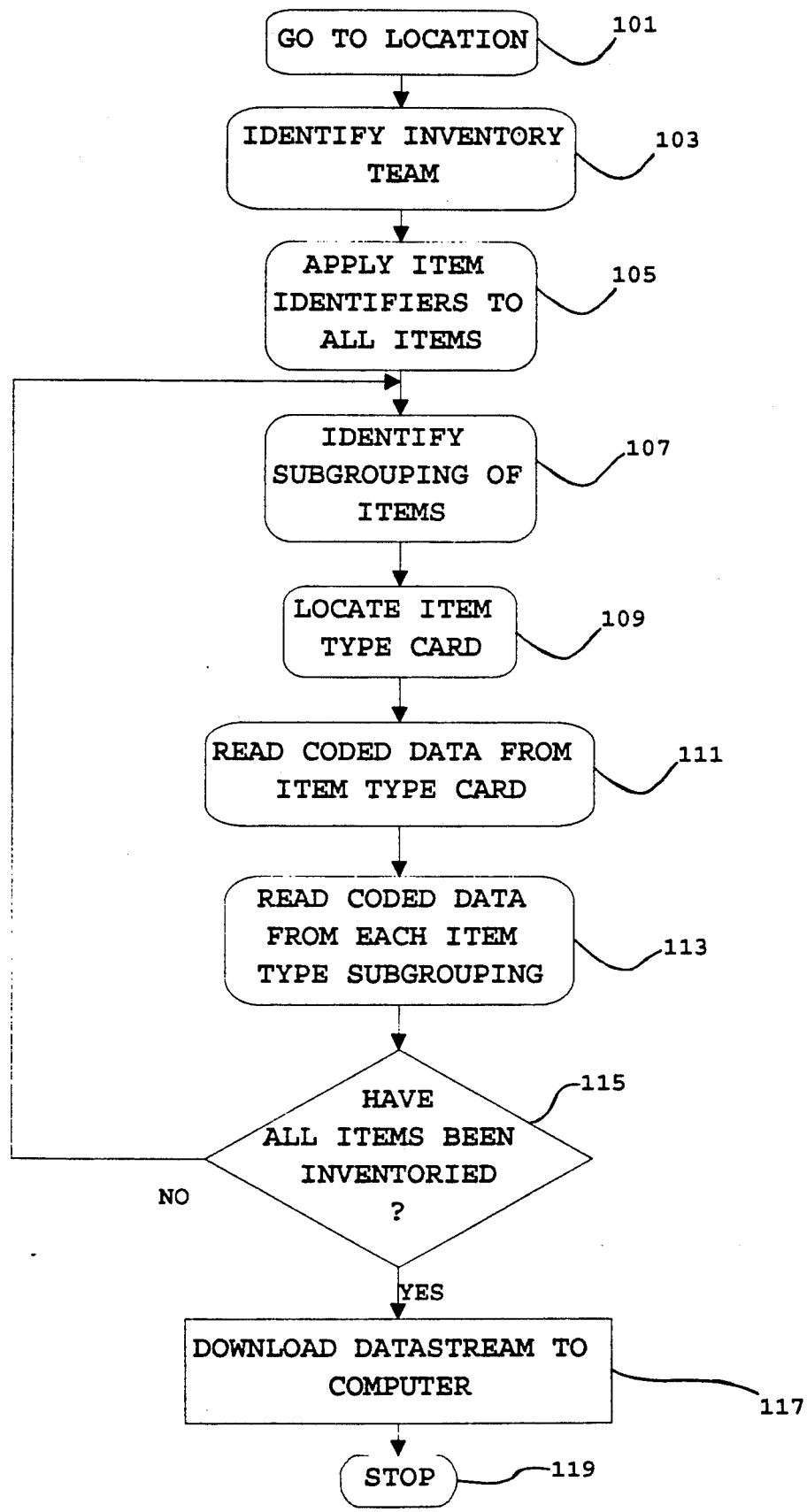
Figure 11A:
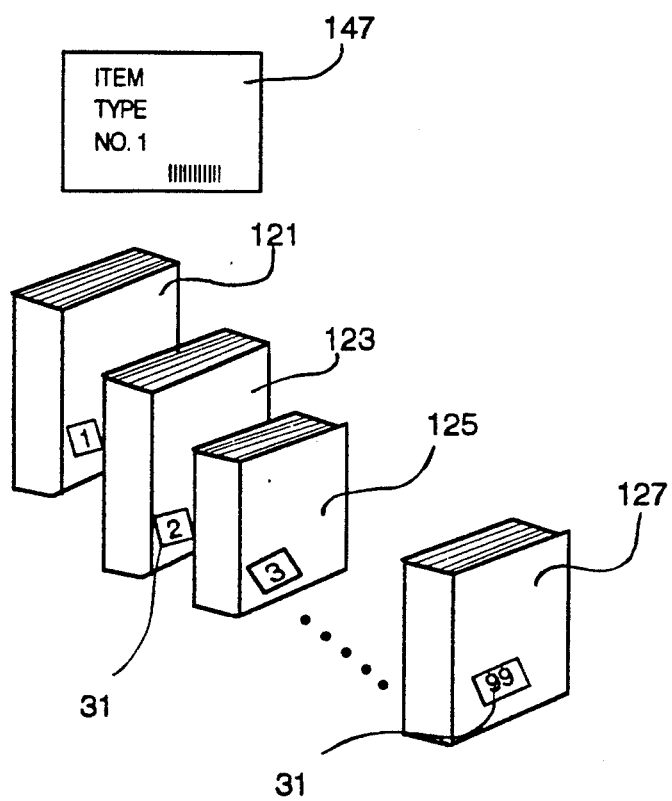
Figure 11B:
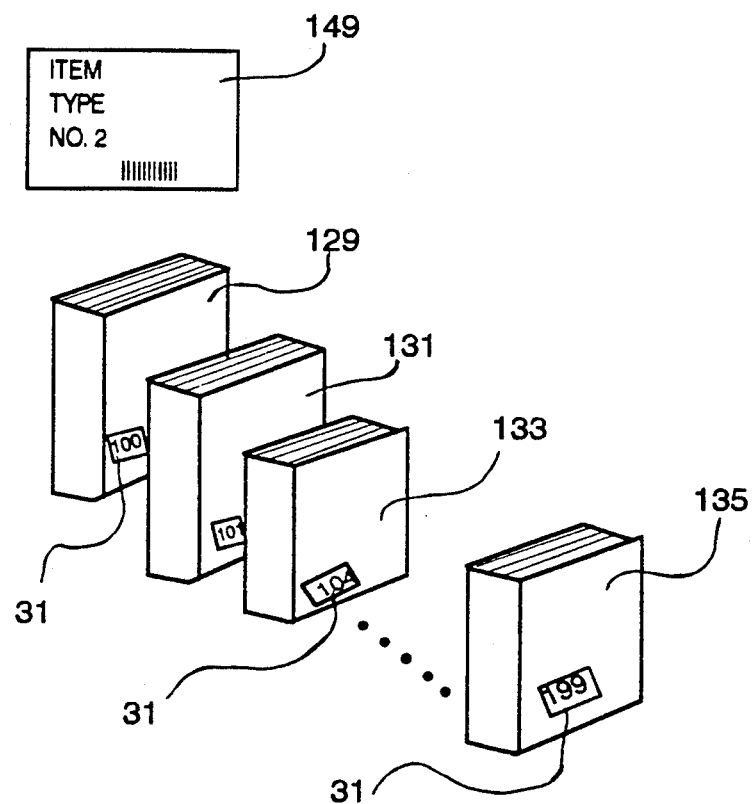
Figure 11C:
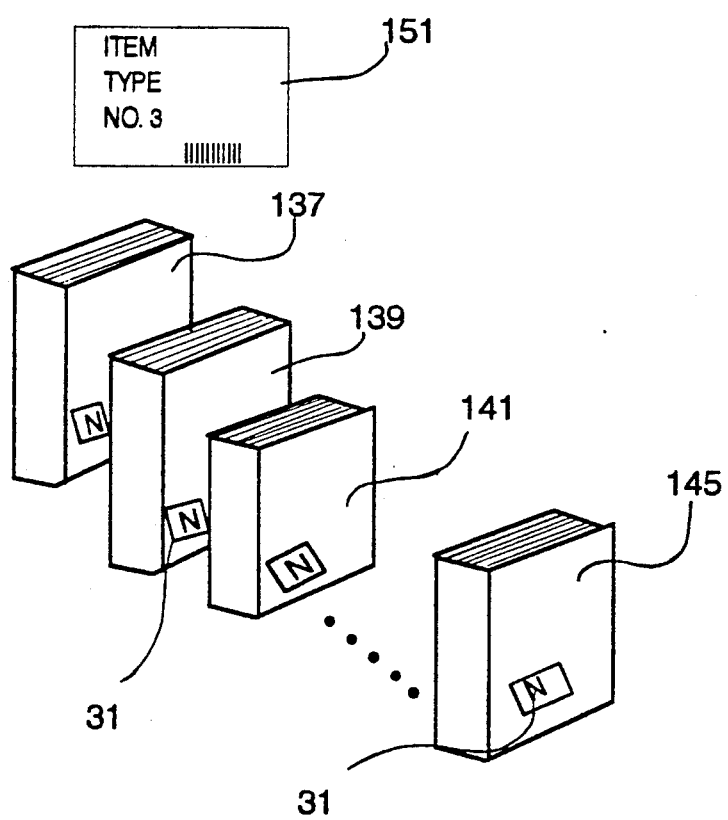
Figure 12:
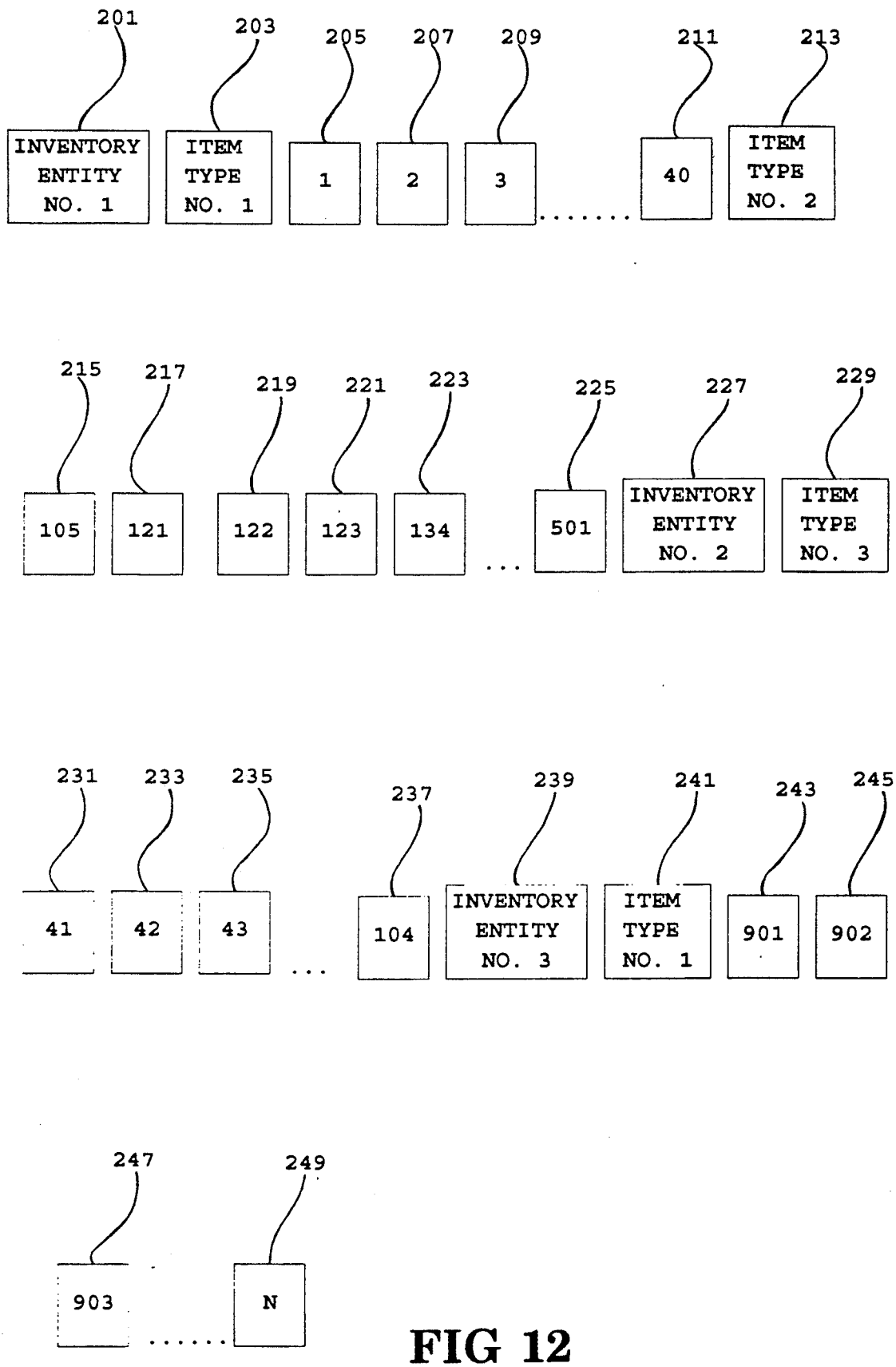
Figure 13:
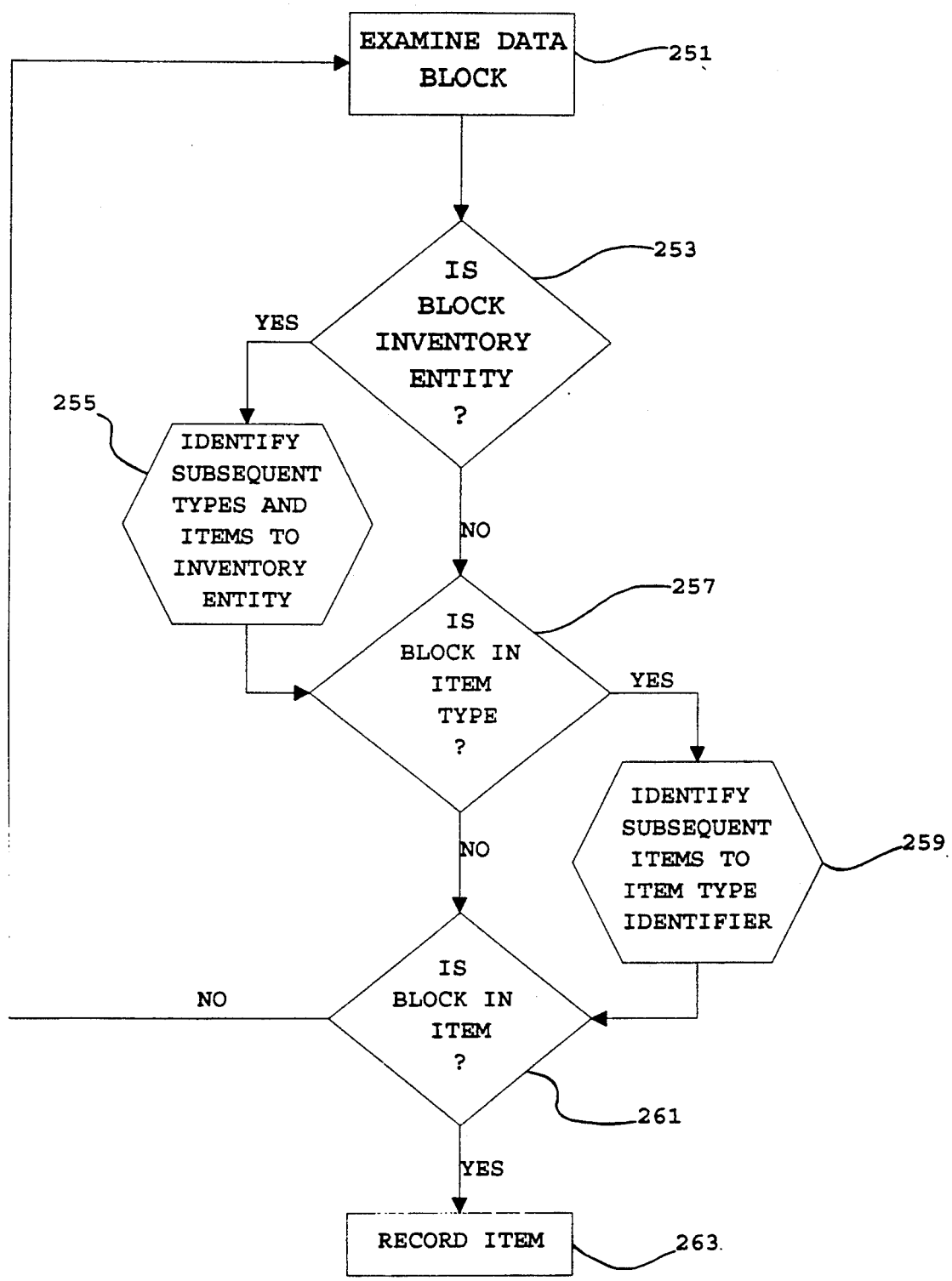

FIGS. 9a, 9b, and 9c depict a plurality of inventory entity identifiers, item type identifiers, and item identifiers;

FIG. 10 is a flow chart depicting the inventory process of the present invention;

FIGS. 11a, 11b, and 11c depict the method Of inventorying a plurality of inventory items, of differing item type subgroupings;

FIG. 12 is a graphic depiction of a data stream generated by the inventory method of the present invention; and FIG. 13 is a flow chart representation of the method used by the computer program of the present invention to analyze the data stream which is provided to it from the portable data readers.

DETAILED DESCRIPTION OF THE INVENTION

Figure 1:
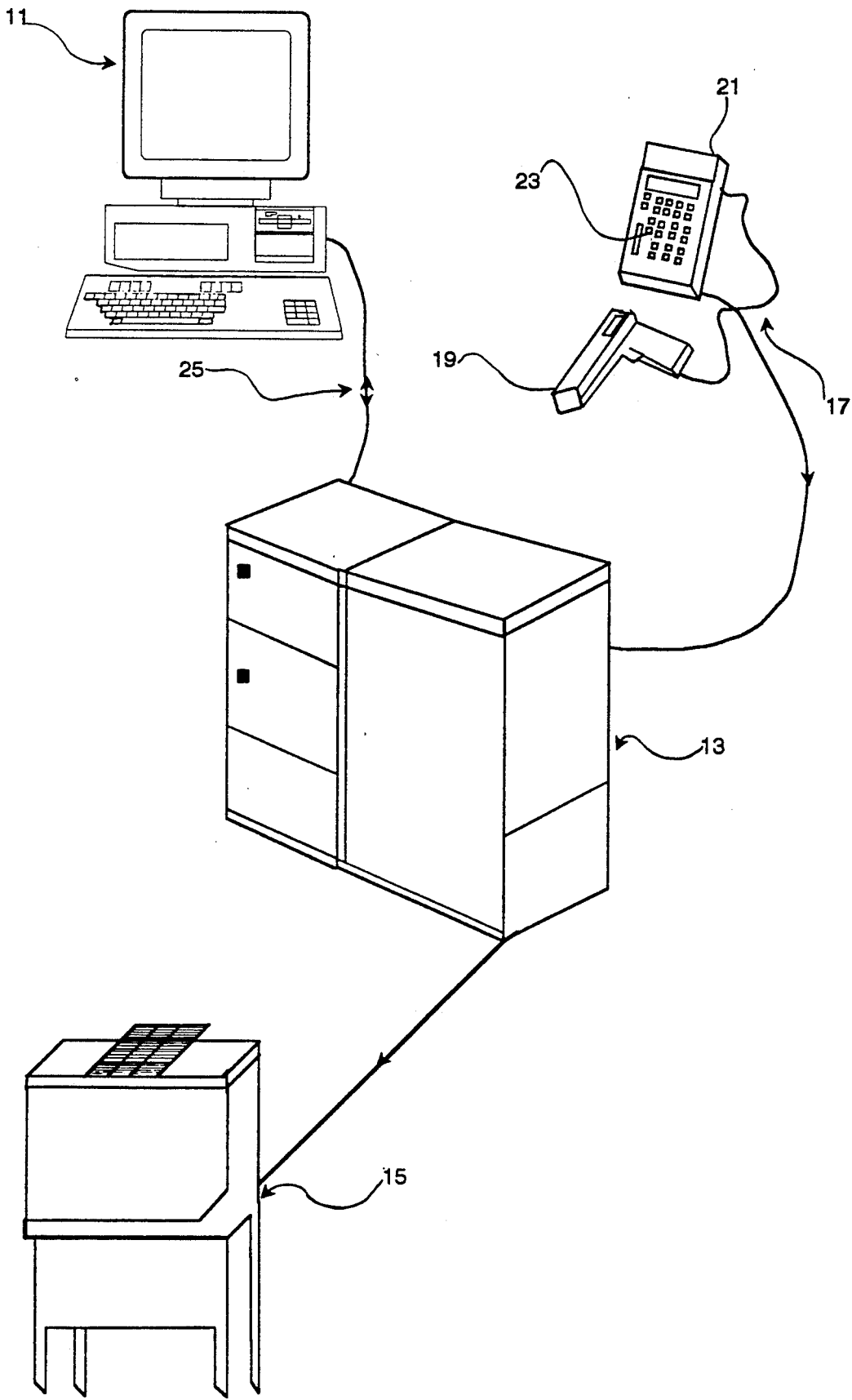
FIG. 1 is a perspective view of the computer hardware and other equipment used for the inventory system of the present invention.

FIG. 1 is a view of the hardware components which cooperate to form the inventory system of the present invention. PC terminal 11 is linked to host computer 13 over bi-lateral data bus 25. Host computer 13 is in turn connected to printer 15, which is a printer suitable for printing bar code labels and human readable labels and reports.

Handheld scanner unit 17 includes bar code laser scanner 19 for reading bar coded items, and memory unit 21, which further includes key pad 23 for the manual entry of data. The data accumulated in memory unit 21 may be down-loaded to host computer 13.

In the preferred embodiment, host computer 13 comprises a Model U6000/5X computer with an Intel 386 microprocessor, manufactured by Unisys Corporation of Blue Bell, Pa. Preferably, printer 15 comprises a Model No. L150 Bar Code Label Printer with graphics card and bar code software, manufactured by Printronix of Irvine, Calif. In the preferred embodiment, handheld scanner unit 17 comprises a Model No. LS2000 solidstate, handheld, visible laser diode scanner, manufactured by Symbol Technologies, Inc. of Bohemia, N.Y., which is coupled to MSI PDT Plus portable data terminal manufactured MSI Data Corporation of Costa Mesa, Calif.

Figure 2:
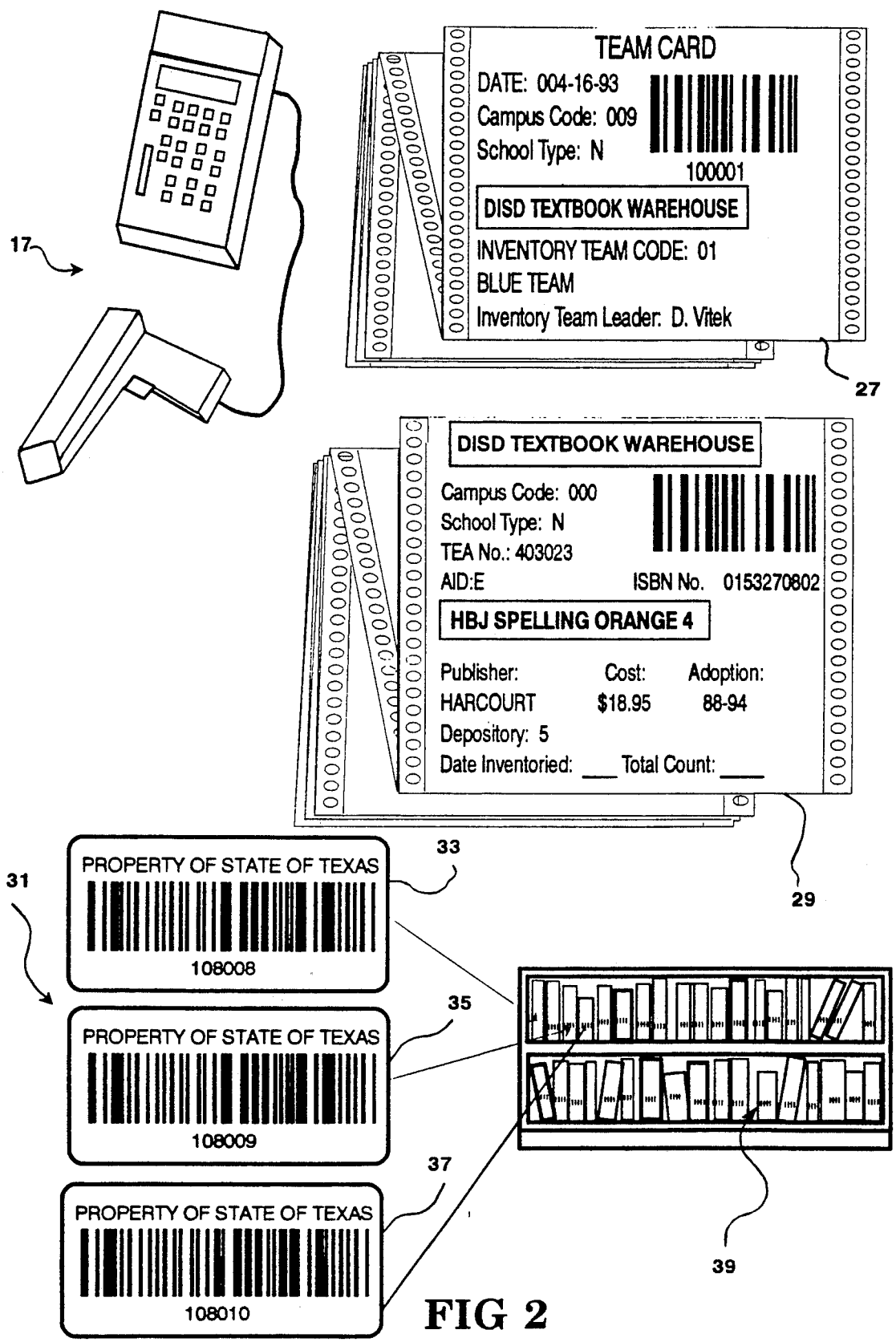
FIG. 2 is a perspective view of the items which cooperate to allow the inventorying of a plurality items in a a supply at a particular location.

With reference now to FIG. 2, handheld scanner unit 17 is employed to read machine readable data from team card 27, item type card 29, and item identifiers 31. In the preferred embodiment, item identifiers 31 comprise planar tags 33, 35, and 37 which are affixed to books 39, or similar items.

Team card Z7 is a planar paper printed card which contains machine readable and human readable data 41, 43 imprinted thereon, which relate to and identify one of a plurality of known inventory entities.

Item type card 29 is a planar card imprinted with machine readable and human readable data, which pertain to one of a plurality of subgroupings of similar item types in an inventory.

Item identifiers 31 carry machine and human readable information for uniquely identifying each item in the supply independently of item type subgroupings.

Figure 3:
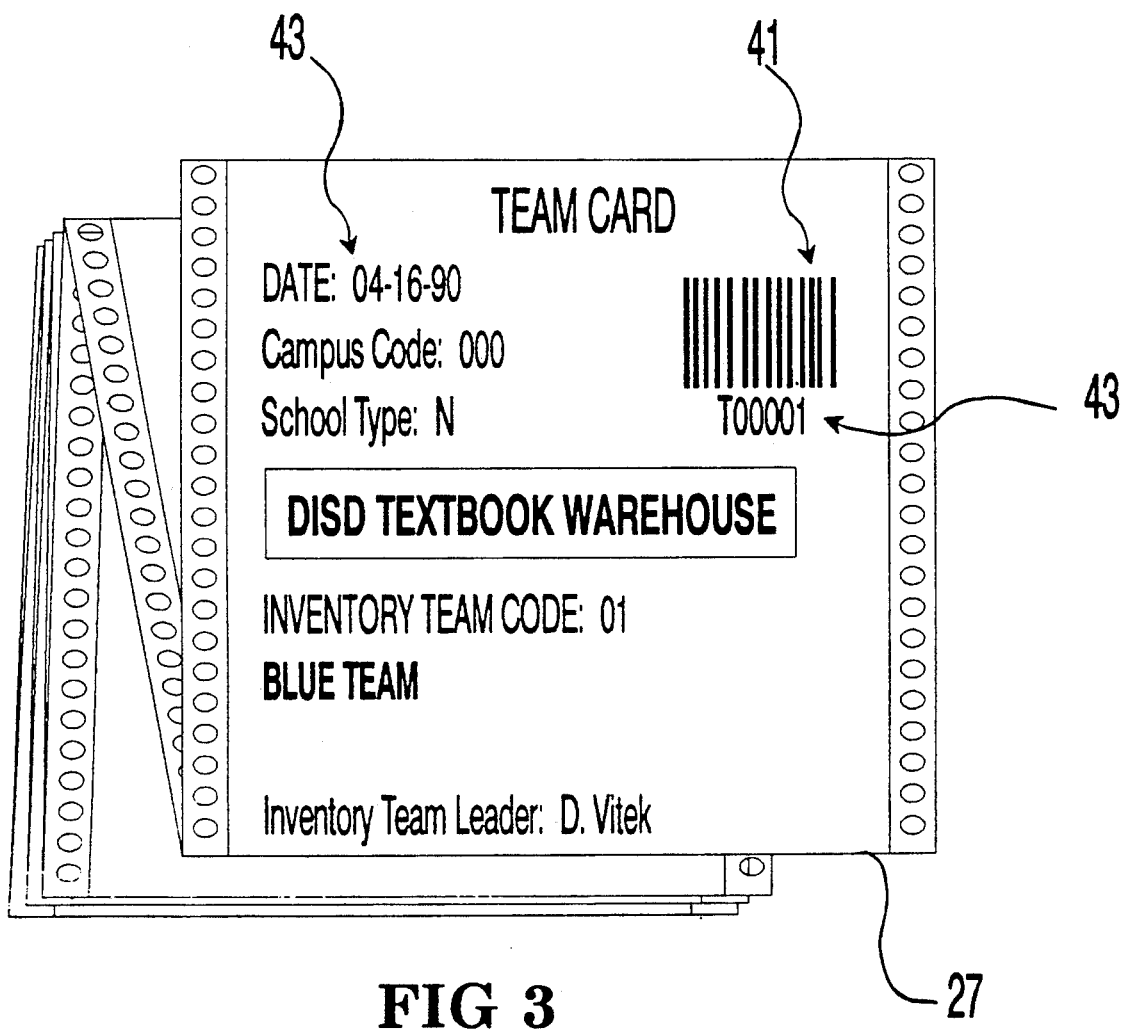
FIG. 3 depicts an inventory team card which is used to identify and distinguish one inventory team from other inventory teams.

Team card 27 is depicted again in FIG. 3. Team card 27 includes machine readable data 41 and human readable data 43. A plurality of fields of data are provided in computer program 45 which is resident in memory in host computer 13, and are provided to specifically identify the inventory entity which is responsible for any particular inventory job at any particular location which contains items in the supply.

As shown, fields are provided for the notation of date, campus, and school type. Furthermore, fields are provided for identification of the inventory team code, inventory team name, and inventory team leader. All these fields of data are represented by the team identifier, which is positioned on the right hand side of team card 27 in machine readable and human readable form. In the preferred embodiment, machine readable data 41 comprises bar code symbology which is imprinted directly on the card. Directly below the bar code symbology is a human readable version of the team number. As shown in FIG. 3, the team number includes an alphanumeric prefix, which serves to identify the number as representative of an inventory team.

The team card is a useful feature, since it allows the inventory manager to police the work product of particular inventory teams. It is expected that relatively low skilled individuals will be assigned the task of inventorying books or other items in a supply. Therefore, it is necessary to have an efficient means for ensuring that errors in the inventory process can be attributed to particular inventory entities, who can be held accountable for errors or omissions in the inventory process.

FIG. 4 is a tabular representation of some of the data fields which can be created for a team identifier. As shown, team codes, team names and team leader names may be provided. Of course, it is also possible to provide additional fields of data which may further identify the team and team members. In the preferred embodiment, the fields of data illustrated in tabular form in FIG. 4 are filled by entries made at PC terminal 11. Therefore, as team leaders and compositions change, new and different team cards 27 may be created to allow the inventory work product to be attributed to particular identifiable inventory entities.

Figure 5:
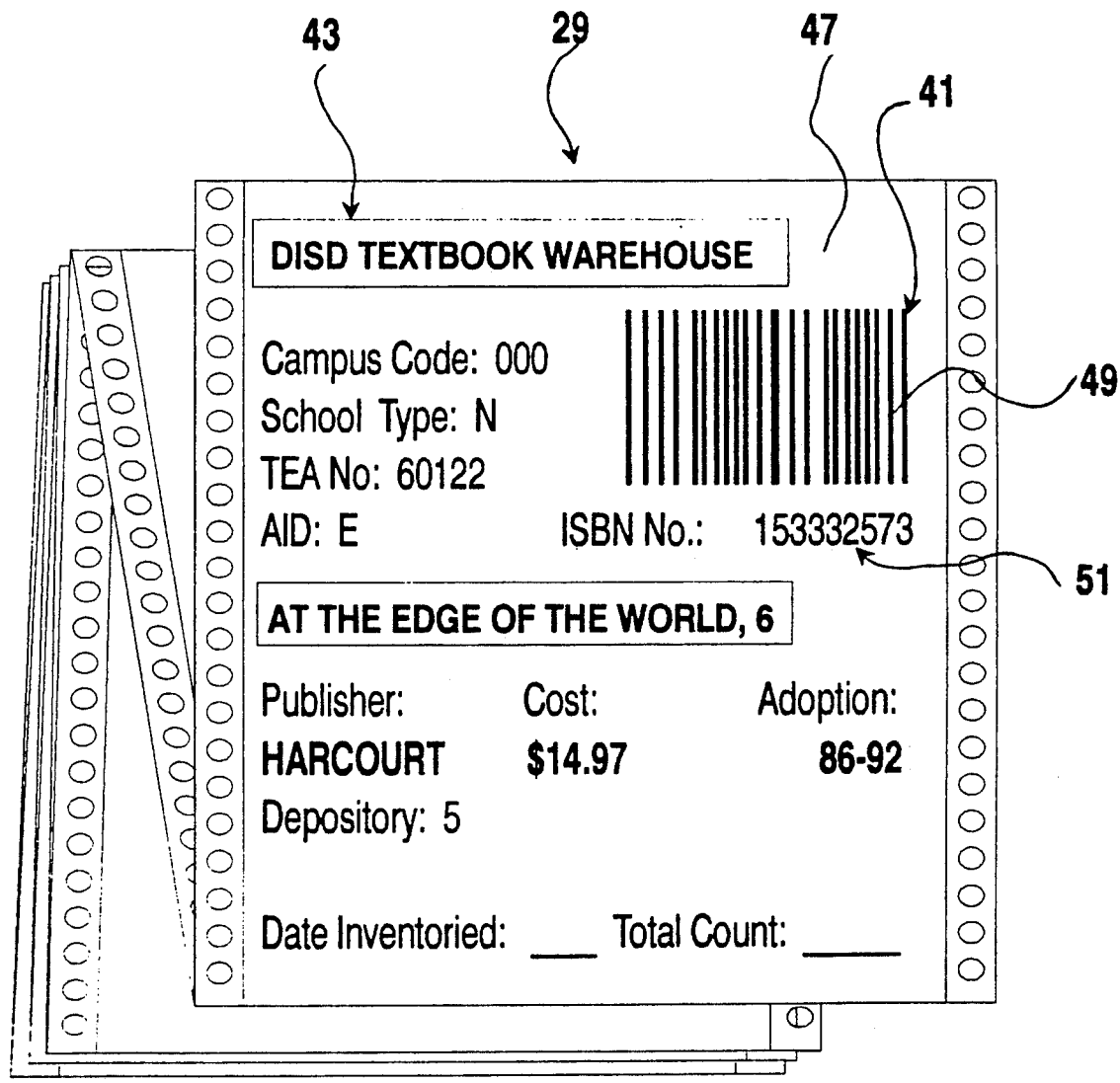
FIG. 5 depicts a book card which is used to identify and distinguish a particular item type from other item types in the inventory supply.

FIG. 5 is another depiction of item type card 29, of FIG. 2, which is a machine readable information carrier with data relating to and identifying a unique and particular item type. In the preferred embodiment, the item type card 29 contains information relating to a particular book type, which constitutes a subgrouping within the inventory supply. Like team card 27, item type card 29 includes both machine readable data 41 and human readable data 43. In the preferred embodiment, machine readable data 41 comprises bar code 49 which is imprinted directly on planar paper card 47. Directly beneath bar code 49 is a human readable version 51 of the bar code data.

Like team card 27, item type card 29 includes a plurality of human readable data blocks 43, which correspond to data fields established in computer program 45 for particularly identifying the item type from other item types in the inventory supply. As shown, such data fields may relate to campus code, school type, administrative agency numbers, international standard book number, publisher identification, cost, adoption dates, date inventoried, and other useful items. Additional data fields may be established within computer program 45 which provide additional detail relating to the item type of item type card 29. These data fields need not be printed to planar paper card 47, and may in fact be concealed from the inventory entities.

FIG. 6 depicts in tabular form a number of possible data fields which can be linked to a particular item type identifier.

In the preferred embodiment, thirty-four data fields are provided for a particular item type identifier 29. FIG. 6 shows these data fields, as including international standard book number (ISBN), catalog code number, book title, price, publisher, copyright information, dates of adoption, approval status, quota information, reorder information, credentialing information, and other important pertinent information which aids one in maintaining the supply of books for the school district.

Figure 7:
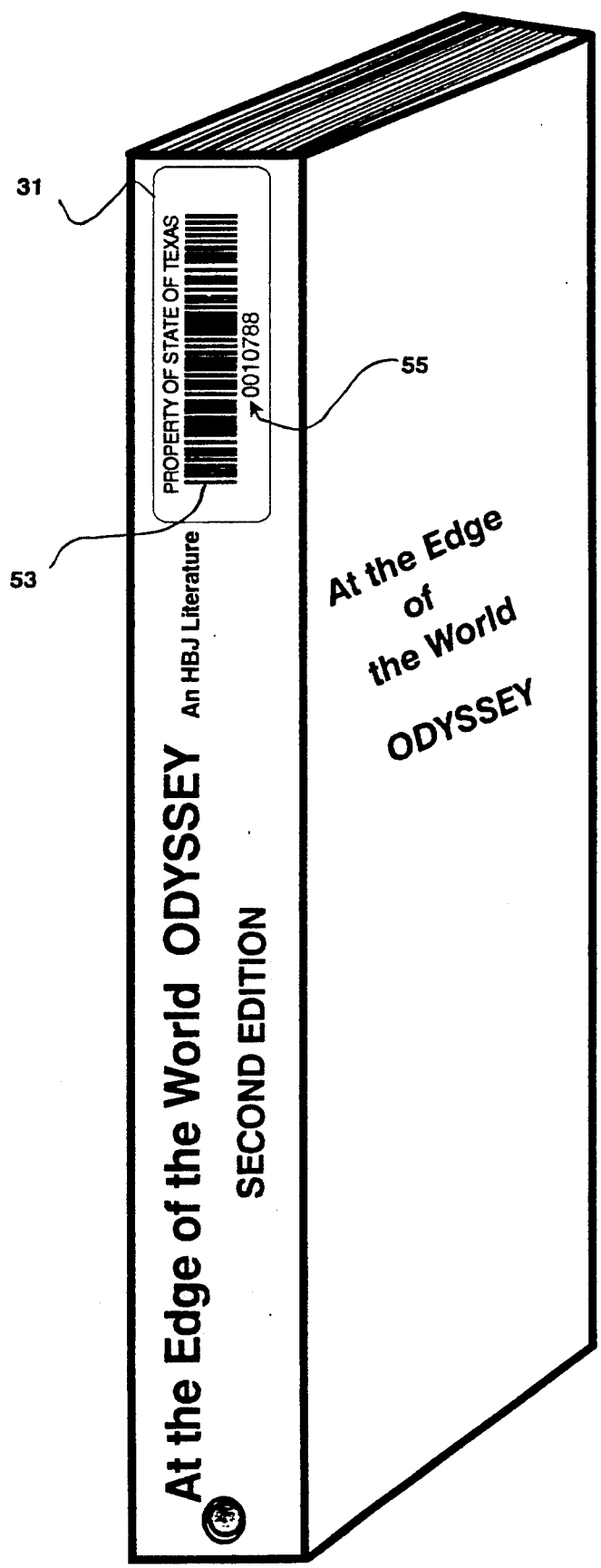
FIG. 7 depicts a label which contains an individual identifier code, unique from all other identifiers, which is affixed to each item.

FIG. 7 depicts an item identifier 31 affixed to the spine of book 39. In the preferred embodiment, item identifier 31 is the simplest of all the information carriers, and includes only bar code 53 and human readable representation 55 of the information contained in bar code 53.

FIG. 8 is a tabular representation of some of the data fields which may be linked to item identifier 31 in computer program 45. As shown, information pertaining to international standard book number (ISBN), campus codes, inventory team codes, inventory dates, and student identification may be provided. In the preferred embodiment, a plurality of fields of data are provided for the student identification. This allows the teachers and school administrators to track the ownership of particular books, and to identify students who are destructive of the books in their possession. Preferably, six separate fields are provided for identifying six students, which should ordinarily suffice to track the chain of custody of a particular book over a six year period. In order to prevent students from interfering with the integrity of the inventory system by removing or switching item identifiers 31, the item identifiers 31 are secured to each book 39 by use of a laminate 55 which holds the item identifier 31 securely to the book cover or spine. Removal of laminate 55 results in a destruction of bar code 53.

FIGS. 9a, 9b, and 9c depict a plurality of inventory entity identifiers 57, item type identifiers 59, and item identifiers 61. As shown, the plurality of inventory identity identifiers 57 includes human readable and machine readable data. In a preferred embodiment, the machine readable data is provided on each of the plurality of inventory identity identifiers 57 by a bar code. As shown, each of the plurality of inventory entity identifiers 57 is numbered with a sequential number starting at one, and ending at "N" which represents the last inventory entity. Likewise, each of the plurality of item type identifiers 59 is marked with both human readable and machine readable data. Each of the plurality of item type identifiers 59 is marked with a sequential integer from one to "N." Of course, the human readable data (numbers one through "N") and the machine readable data (the bar code markings) both identify a integer between one and "N."

A shown in FIG. 9c, the plurality of item identifier 61 represent a plurality of tags or labels which carry both machine readable and human readable data. The bar code 63 on each item identifier 61 corresponds to the human readable number on the label. For example, the fifth item identifier 61 is labeled with both a human readable "5" and a machine readable bar code marking which corresponds to the numeral "5."

It is necessary for computer 45 to be able to distinguish inventory entity identifiers 57 from item type identifier 59, and item identifiers 61. In the preferred embodiment, this is accomplished by providing a distinct alphanumeric prefix for each bar code 63 of inventory entity identifiers 57 and item type identifier 59. Preferably, a letter prefix "T" is provided as the first character on each bar code 63 of inventory entity identifier 57. Therefore, the machine readable bar code 63 of the plurality of inventory entity identifier 57 are in a sequence of: T00001, T00002, T00003, . . . TN. One or more of the digits may signify the location at which the inventory is to occur.

The plurality of item type identifiers are also distinguished by a letter character prefix in the bar code 63. Preferably, a prefix "B" is provided as the first character in each machine readable bar code 63. Therefore, the plurality of item type identifiers 59 are provided in a sequence of: B1, B2, B3, . . . BN. No letter prefix is provided on the plurality of item identifier 61. In this fashion, computer 45 is capable of distinguishing blocks of machine readable data by the prefix to the identifiers. Alternately, it may be possible to use international standard book numbers (ISBN) as the type identifiers, or Uniform Product Codes to denote the item type.

The method of inventorying a plurality of items in a supply is depicted in FIGS. 10 and 11. The supply of items includes a plurality of subgroupings of similar item types distributed in a selected pattern among the plurality of known locations. The inventory process is done by a plurality of known inventory entities. For example, in a school district, a supply of text books includes a number of subgroupings of text book types. The text books are distributed in a selected pattern among a plurality of known locations, including text book depositories, and schools.

In operation, as shown in FIG. 10, the inventory teams are sent to separate locations. For example, team #1 may sent to a high school. Team #2 may be sent to an elementary school. Team #3 may be sent to a middle school. Team "N" may be sent to a warehouse.

Referring now to FIG. 10, in step 101, the inventory teams are separated into different locations. In step 103, the inventory team uses handheld scanner unit 17 to read the machine readable data into memory unit 21. Next, in step 105, each inventory team will apply an item identifier 31 to each of the books 39 found at that location. It is important to note that the item identifiers 31 need not be applied in any particular order. In fact, a random order of application is acceptable. All that is required is that each book 39 at the location receive one of the plurality of item identifiers 61.

In step 107, the inventory team identifies subgroupings of books. For example, seventh grade math books from a particular publisher may be found in one stack, while eighth grade English text from a particular publisher may be found in a separate stack. In step 109, the inventory team identifies and locates the item type card 29 which corresponds to each particular stack of books. In step 111, the inventory team uses handheld scanner unit 17 to read the coded data from the item type card 29. Next, in step 113, the inventory team uses handheld scanner unit 17 to read the bar coded data from item identifiers 31 from each of the books which are identified by the item type card 29.

As shown in step 115, the process is continued until all books at the particular location are inventoried by use of handheld scanner unit 17.

In step 117, the inventory teams return to a central location to down-load data from memory unit 21 of handheld scanner unit 17 to host computer 13. In step 119, the inventory process is completed.

FIGS. 11a, 11b, and 11c depict more specifically the inventorying method of the present invention. FIG. 11a depicts one subgrouping of items, specifically one type or edition of a text book. Each of the text books have an item identifier 31 affixed to its cover by a transparent and durable laminate 55. Of course, each item identifier 31 includes both human readable and machine readable data.

In inventorying the books of FIG. 11a, the inventory team reads the item type number from item type card 147. Next, the inventory team reads the machine readable data from item identifies 31 from books 121, 123, 125 . . . , 127.

The next type of books are identified, as shown in FIG. 11b. The inventory team identifies the item type by reading the item type card 149 with handheld scanner unit 17. Then, the inventory team scans the item identifiers 31 for books 129, 131, 133, . . . 135.

The third type of text books are identified in FIG. 11c. The inventory team first identifies the type of book by scanning item type card 151 with handheld scanner unit 117, and then enters the item identifiers 31 from books 137, 139, 141, . . . , 145.

A sample data stream created during an inventory process is depicted in FIG. 12. As shown, the first data block 201 is an inventory entity number, specifically inventory entity #1. The next data block 203 is an item type number, specifically item type #1. Data blocks 205, 207, 209, and 211 are item identifier numbers which are affixed to individual books. Data blocks 201 through 211 signify that inventory entity #1 has identified a subgrouping of book types #1, (for example, a third grade math text) and has inventoried a total of forty such texts.

Data block 213 identifies a second item type, for example, a fourth grade grammar text. Data blocks 215, 217, 219, 221, 223, and 225 are individual texts in the subgrouping which correspond to the item type #2 identified in data block 213. Data blocks 213 through 225 signify that inventory entity #1 has identified a subgrouping of text books (type #2) and has inventoried a number of texts (105, 121, 122, 123, 134, . . . 501).

As shown by data blocks 215 through 225, under the present invention, it makes no difference that the individual text books of item type #2 are tagged with item identifiers 31 which are out of numerical sequence, or even in random sequence. All that matters is that no text book in the supply of books has an item identifier number which is identical to that of any other book in the supply.

Therefore, it is possible for multiple inventory entity teams to work in parallel to simultaneously inventory at separate locations subgroupings of texts which are also found at other locations. In other words, the text books of one type need not all be assembled in one place. This is a very beneficial feature. For example, book warehouses may be very disorganized, and have physically separated stacks of books belonging to a similar book type. Inventorying such books would be a formidable chore if the inventory entity was required to assemble all book types in one location prior to marking the inventory. With the system of the present invention, it is possible for a number of inventory entities to begin simultaneous work of inventorying without coordinating their efforts to group together any subgroupings of similar book types.

Another important feature of the present invention is that the item identifiers need not carry any informnation specific to particular book types, or book locations. The inventory process becomes quite formidable if each inventory identifier is required to carry information specific to the book type. In the present invention, a school district with one million books may print one million book identifiers which carry the sequential numerals one through one million. These item identifiers may be printed in sheaths, and distributed among the inventory entities without regard to book types or book locations.

Returning now to FIG. 12, data block 227 identifies a second inventory entity. Data block 229 identifies a third item type. Data blocks 231, 233, 235, 237 identify a plurality of particular books which are identified by data block 229, the item type. Data block 239 identifies a third inventory entity. Data block 241 identifies item type #1. Data blocks 243, 245, 247, and 249 identify a plurality of items which correspond to item type #1.

The system of the present invention operates by identifying certain data blocks in the data stream to a preceding inventory and type identifier. The manner in which computer program 45 handles the data stream is depicted in flow chart form in FIG. 13. In step 251, the host computer 13 examines a data block. The computer 13 determines in step 253 if the data block is an inventory entity. As discussed above, a letter prefix identifies the data block as identifying particular inventory entity.

If the data block identifies an inventory entity in step 253, the computer 13 will identify subsequent item types and individual items to that particular inventory entity, in step 255. If the data block is not recognized as identifying an inventory entity in step 253, the process continues at step 257 where the particular data block is examined to determine if it corresponds to a particular item type.

As discussed, different item types are designated by a letter prefix. In the preferred embodiment, the letter "B" identifies a character block as an item type data block. If in step 257, the computer 13 identifies the data block as identifying a particular item type, the process continues in step 259, where the computer will identify subsequent items to that item type identifier. If the computer 13 determines that the data block examined in step 257 does not represent an item type, the process continues in step 261.

In step 261, the computer 13 determines whether the data block represents an item. If so, the item is recorded to memory in step 263. If not, the process continues in step 251 by examination of the next data block.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is;

1. A method of inventorying a plurality of items in a supply, said items including a plurality of subgroupings of similar item types distributed in a selected pattern among a plurality of known locations, said method of inventorying being performed by a plurality of known inventory entities, comprising:
   providing a plurality of first machine readable information carriers each with data relating to and identifying a unique and particular item type of said plurality of items in said supply;
   providing a plurality of second machine readable information carriers for uniquely identifying each item in said supply independently of item type subgroupings;
   providing a data reader for reading and recording data from said first and second machine readable information carriers;
   providing a computer with a program resident in memory for receiving said data from said data reader;
   applying one of said plurality of second machine readable information carriers to each of said items in said supply;
   reading with said data reader a selected first machine readable information carrier, corresponding to a particular subgrouping of said item types;
   reading with said data reader, prior to reading a subsequent first machine readable information carrier, a plurality of said second machine readable information carriers of a particular subgrouping of a single item type; thereafter
   reading with said data reader additional ones of said first machine readable information carriers and second machine readable information carriers of other particular item types; and
   transferring data read from said first and second machine readable information carriers to said program in said computer to form a database.

2. A method of inventorying according to claim 1, wherein said first and second machine readable information carriers also include human readable data.

3. A method of inventorying according to claim 1, wherein said first and second machine readable information carriers comprise planar cards with data encrypted thereon in a bar code symbology.

4. A method of inventorying according to claim 1, wherein said computer program includes a plurality of fields for receiving data pertaining to said item and said item type.

5. A method of inventorying according to claim 1, wherein said computer program includes a plurality of fields for receiving data pertaining to said item and item type and wherein said data fields and data obtained from said first and second machine readable information carriers are arranged in a relational database.

6. A method of inventorying according to claim 1, further comprising:
   providing a third machine readable information carrier with data relating to and identifying a particular inventory entity of said plurality of known inventory entities;
   reading with said data reader said third machine readable information carrier to identify said particular inventory entity; and
   associating said data relating to and identifying said particular inventory entity of said plurality of known inventory entities to said data read from said first and second machine readable information carriers.

7. A method of inventorying according to claim 1, wherein said first machine readable information carriers include data pertaining to a particular location at which said items are located.

8. A method of inventorying according to claim 1, wherein said second machine readable information carriers are secured to said items in a manner which destroys said machine readable data if said second machine readable information carrier is removed from said items.

9. A method of inventorying according to claim 1, wherein said second machine readable information carriers are affixed to said items prior to reading said data with said data reader.

* * * * *